United States Patent
Rahmat et al.

(10) Patent No.: US 9,588,310 B2
(45) Date of Patent: Mar. 7, 2017

(54) METHOD AND APPARATUS FOR ALIGNING OF OPTO-ELECTRONIC COMPONENTS

(71) Applicant: Quantum Electro Opto Systems Sdn. Bhd., Melakia (MY)

(72) Inventors: Idris Rahmat, Johor (MY); Huan Sin Lee, Melaka (MY); Tuan Chin Teyo, Selangor (MY); Gabriel Walter, Madison, WI (US)

(73) Assignee: Quantum Elctro Opto Systems Sdn Bhd., Melaka (MY)

( * ) Notice: Subject to any disclaimer, the term of this patent is extended or adjusted under 35 U.S.C. 154(b) by 907 days.

(21) Appl. No.: 13/924,943

(22) Filed: Jun. 24, 2013

(65) Prior Publication Data

US 2014/0233887 A1      Aug. 21, 2014

Related U.S. Application Data

(60) Provisional application No. 61/690,377, filed on Jun. 25, 2012.

(51) Int. Cl.
  *G02B 6/42* (2006.01)
  *G02B 27/62* (2006.01)
  *G02B 6/32* (2006.01)

(52) U.S. Cl.
  CPC ......... *G02B 6/4231* (2013.01); *G02B 6/4224* (2013.01); *G02B 6/4292* (2013.01); *G02B 27/62* (2013.01); *G02B 6/32* (2013.01)

(58) Field of Classification Search
  None
  See application file for complete search history.

(56) References Cited

U.S. PATENT DOCUMENTS

| | | | | |
|---|---|---|---|---|
| 4,694,477 | A | | 9/1987 | Siddall ........................... 378/34 |
| 5,215,489 | A | * | 6/1993 | Nakamura ........... G02B 6/4292 385/119 |
| 6,095,697 | A | * | 8/2000 | Lehman ................. G02B 6/423 385/88 |

(Continued)

FOREIGN PATENT DOCUMENTS

| | | |
|---|---|---|
| JP | 2010-271444 | 12/2010 |
| WO | WO2005/020287 | 3/2005 |
| WO | WO2006/093883 | 9/2006 |

OTHER PUBLICATIONS

"Nanometric Positioning Technology", CVI Melles Griot, (sheets 1-4), http://www.cvimellesgriot.com/products/Documents/TechnicalGuide/Nanometric_Positioning_Techlnology.pdf.

*Primary Examiner* — Mike Stahl
(74) *Attorney, Agent, or Firm* — Martin Novack

(57) ABSTRACT

A method for aligning a ferrule-mounted optical fiber with the optical axis of an electro-optical device, including the following steps: providing an alignment marking with respect to the device in relation to the optical axis; providing an annular receptacle and a tubular alignment pin with a central passageway, having its proximal end slidably fitted in the annulus of the receptacle; aligning the proximal end of the alignment pin with the alignment marking; securing the device to the receptacle; removing the alignment pin from the receptacle; and inserting the ferrule-mounted optical fiber into the receptacle.

15 Claims, 6 Drawing Sheets

(56) References Cited

U.S. PATENT DOCUMENTS

| | | | |
|---|---|---|---|
| 6,661,951 B1 * | 12/2003 | Blair | G02B 6/4204 385/33 |
| 7,068,891 B1 | 6/2006 | Cook et al. | 385/52 |
| 7,091,082 B2 | 8/2006 | Feng | 438/235 |
| 7,223,024 B2 | 5/2007 | Fincato | 385/88 |
| 7,286,583 B2 | 10/2007 | Feng et al. | 372/30 |
| 7,354,780 B2 | 4/2008 | Feng et al. | 257/292 |
| 7,535,034 B2 | 5/2009 | Walter et al. | 372/43 |
| 7,693,195 B2 | 4/2010 | Feng et al. | 372/30 |
| 7,696,536 B1 | 4/2010 | Feng et al. | 257/197 |
| 7,711,015 B2 | 5/2010 | Holonyak et al. | 372/11 |
| 7,813,396 B2 | 10/2010 | Feng et al. | 372/43.01 |
| 7,888,199 B2 | 2/2011 | Walter et al. | 438/235 |
| 7,888,625 B2 | 2/2011 | Holonyak, Jr. et al. | 250/214 |
| 7,953,133 B2 | 5/2011 | Holonyak, Jr. et al. | 372/43.01 |
| 7,998,807 B2 | 8/2011 | Feng et al. | 438/235 |
| 8,005,124 B2 | 8/2011 | Then et al. | 372/46.011 |
| 8,179,937 B2 | 5/2012 | Walter et al. | 372/38.05 |
| 8,179,939 B2 | 5/2012 | Holonyak, Jr. et al. | 372/43.01 |
| 2004/0028349 A1 | 2/2004 | Nagasaka et al. | 385/88 |
| 2005/0040432 A1 | 2/2005 | Feng et al. | 257/198 |
| 2005/0054172 A1 | 3/2005 | Feng | 438/313 |
| 2007/0021014 A1 | 1/2007 | Fukuda | 439/876 |
| 2008/0240173 A1 | 10/2008 | Holonyak et al. | 372/9 |
| 2009/0134939 A1 | 5/2009 | Feng et al. | 327/581 |
| 2009/0245735 A1 | 10/2009 | Shaddock et al. | 385/92 |
| 2010/0034228 A1 | 2/2010 | Holonyak et al. | 374/45 |
| 2010/0202483 A1 | 8/2010 | Walter et al. | 372/45.01 |
| 2010/0202484 A1 | 8/2010 | Holonyak et al. | 372/45.01 |
| 2010/0272140 A1 | 10/2010 | Walter et al. | 372/38.02 |
| 2010/0289427 A1 | 11/2010 | Walter et al. | 315/219 |
| 2011/0150487 A1 | 6/2011 | Walter | 398/115 |
| 2012/0068151 A1 | 3/2012 | Walter | 257/9 |

\* cited by examiner

FIG. 7a  FIG. 7b

METHOD AND APPARATUS FOR ALIGNING OF OPTO-ELECTRONIC COMPONENTS

PRIORITY CLAIM

Priority is claimed from U.S. Provisional Patent Application Ser. No. 61/690,377, filed Jun. 25, 2012, and said U.S. Provisional Patent Application is incorporated herein by reference.

FIELD OF THE INVENTION

This invention relates to the field of opto-electronic communication and, more particularly, to a method and apparatus for producing opto-electronic assemblies, including a method for aligning a ferrule-mounted optical fiber with the optical axis of an electro-optical device, such as a semiconductor light emitting device or a semiconductor photodetector device.

BACKGROUND OF THE INVENTION

In the field of fiber optical communication, there are many important applications where it is necessary to align, with high precision, an optical fiber with an electro-optical device such as a semiconductor light emitting device or a semiconductor photodetector device.

A type of semiconductor light emitting device which is useful for application in the invention is a so-called tilted-charge light-emitting device (TCLED). These devices include three terminal light-emitting transistors (LETs), three terminal transistor lasers (TLs), and two terminal tilted charge light-emitting diodes. Reference can be made to the following documents: U.S. Pat. Nos. 7,091,082, 7,286,583, 7,354,780, 7,535,034, 7,693,195, 7,696,536, 7,711,015, 7,813,396, 7,888,199, 7,888,625, 7,953,133, 7,998,807, 8,005,124, 8,179,937, and 8,179,939; U.S. Patent Application Publication Numbers US2005/0040432, US2005/0054172, US2008/0240173, US2009/0134939, US2010/0034228, US2010/0202483, US2010/0202484, US2010/0272140, US2010/0289427, US2011/0150487, and US2012/0068151; and PCT International Patent Publication Numbers WO/2005/020287 and WO/2006/093883, and the publications referenced in U.S. Patent Application Publication Number US2012/0068151.

In a typical optical transmitter assembly, a chip containing a semiconductor light emitter is coupled with a fiber optical cable, the proximal end of which is mounted in a connector. The chip is secured to a printed circuit board. The semiconductor light emitter may have an associated lens for focusing emitting light into the optical fiber.

The efficient coupling of light from the light-emitting device, with or without a lens, into an optical fiber, is an important aspect of fiber optical communication. Efficient coupling requires precise alignment of the optical axis of light from the light-emitting device with the axis of the input end of the optical fiber. If there is misalignment, a substantial portion of the light may be lost, resulting in undesirable attenuation of the optical signal. Accordingly, precise alignment is recognized as being an important part of producing an optical transmitting assembly.

FIG. 1 is a diagram illustrating an active alignment procedure as utilized in the prior art. [See "Nanometric Positioning Technology", CVI Melles Griot, http://www.cvimellesgriot.com/products/Documents/TechnicalGuide/Nanometric_Positioning_Techlnology.pdf]. In the diagram of FIG. 1 there is shown a focused laser light source 110, a focusing lens 115 and an optical fiber 120. Also shown are the optical axis x, the lateral axis y, and the vertical axis z. When coupling the light from the focused laser source into the optical fiber 120, aligning the fiber to the lens requires a minimum alignment with three axes X, Y and Z. Depending on the manufacturing and fixturing tolerances of the components, adjustment in roll (theta x), pitch (theta y) and yaw (theta z) may be needed.

U.S. Pat. No. 7,068,891 discloses a system and method for aligning and positioning optical fibers, including a system and method for actively aligning an optical fiber to a laser diode. The '891 patent references U.S. Pat. No. 4,694,477, which discloses an apparatus having six degrees of freedom. A single first stage is supported vertically by three actuator assemblies. The actuator assemblies consist of a number of flexures respectively coupling piezoelectric transducers to the first stage at three equiangular points. In the '477 patent, the three vertical actuator assemblies accomplish vertical linear motion and rotation about two perpendicular horizontal axes. Three similar horizontal actuator assemblies are attached to the first stage for accomplishing linear movement of first stage along two perpendicular horizontal axes. When the two parallel horizontal actuator assemblies are moved in opposite directions, rotation of the first stage about the vertical axis is accomplished. Each of the pivot points for the pitch, roll and yaw motions is located within the stage assembly. The '891 patent indicates that this limits the range of travel of the '477 patent equipment. The '891 patent discloses an instrument and method for positioning an article with six degrees of freedom about a selectable pivot point. The instrument includes a base stage for linear motion in two perpendicular axes wherein the perpendicular axes form a plane. A yaw stage is coupled to the base stage for rotational motion about a third axis normal to the plane. The yaw stage has a pivot point locatable outside an envelope defined by the yaw stage. A three-axis stage coupled to the yaw stage provides for rotational motion about each of the two perpendicular axes and linear motion along the third axis. The third stage may also include a mount for fixing the article thereto. A control system is in communication with each of the stages for controlling the positions thereof.

The complexity of the alignment systems and techniques of the prior art, such as in the '477 and '891 patents, is particularly striking. In addition to requiring complex and expensive equipments, typical prior art alignment techniques are complicated and time consuming, and therefore tend to increase the cost of opto-electronic equipment.

It is among the objectives of the present invention to address the indicated limitations of prior art apparatus and techniques and to provide improved alignment of opto-electronic components.

SUMMARY OF THE INVENTION

In accordance with a form of the invention, a method is set forth for aligning a ferrule-mounted optical fiber with the optical axis of an electro-optical device, including the following steps: providing an alignment marking with respect to said device in relation to said optical axis; providing an annular receptacle and a tubular alignment pin with a central passageway, having its proximal end slidably fitted in the annulus of said receptacle; aligning the proximal end of said alignment pin with said alignment marking; securing said device to said receptacle; removing said alignment pin from said receptacle; and inserting said ferrule-mounted optical fiber into said receptacle.

In an embodiment of this form of the invention, the electro-optical device, which can comprise a semiconductor light-emitting device, such as a tilted charge light-emitting device, has an associated lens, and said step of providing said alignment marking comprises providing an alignment marking on said lens. In this embodiment, the step of aligning the proximal end of said alignment pin with said alignment marking comprises aligning the proximal opening of said central passageway with said alignment marking. This can be done by sighting said alignment marking through said central passageway. Also in this embodiment, the step of aligning the proximal end of said alignment pin with said alignment marking further comprises applying a vacuum to said central passageway at the distal end of said alignment pin. With the suction holding the device, or the substrate on which it is mounted, in place, securing of said device to said receptacle can be implemented.

In an embodiment of this form of the invention, an annular spacer is provided between said receptacle and said device before said aligning step. The spacer is positioned to remain in said receptacle when said device is secured to said receptacle. When the light-emitting device has a focusing lens for focusing emitted light, the spacer is provided with an axial dimension that is related to the focal distance between said lens and the end of said fiber mounted in said ferrule.

In accordance with a further form of the invention, an aligning apparatus is set forth for use in a method for aligning a cylindrical ferrule-mounted optical fiber with the optical axis of a light-emitting electro-optical device having an alignment marking in relation to its optical axis, comprising: an annular receptacle having an inner diameter that conforms with the diameter of said ferrule; and a tubular alignment pin with a central passageway, having its proximal end slidably fitted in the annulus of said receptacle; whereby, after aligning the proximal end of said alignment pin with said alignment marking and securing said device to said receptacle, said alignment pin can be removed from said receptacle, and said ferrule-mounted optical fiber can be inserted into said receptacle. A vacuum source is coupleable to the central passageway at the distal end of said alignment pin. In an embodiment of this form of the invention, said device comprises a tilted-charge light-emitting semiconductor device mounted on a substrate, and said substrate is secured to said receptacle after alignment.

Further features and advantages of the invention will become more readily apparent from the following detailed description when taken in conjunction with the accompanying drawings.

BRIEF DESCRIPTION OF THE DRAWINGS

FIG. 2, which includes

FIG. 7, which includes FIGS. 7a, 7b, and 7c, shows the mounting of the substrate with light-emitting chip and optical cable, to a printed circuit board.

DETAILED DESCRIPTION

Figure 2C:
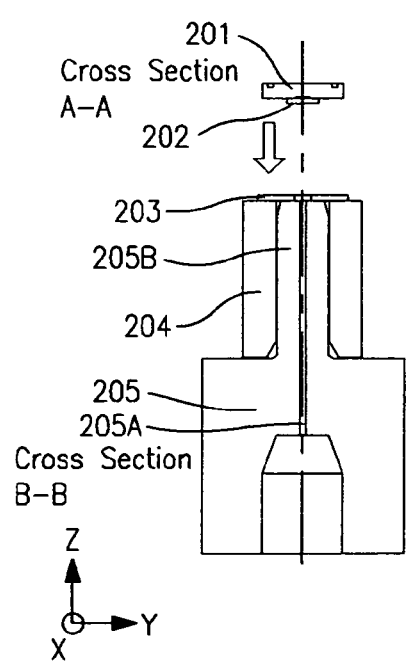
FIGS. 2a, 2b and 2c, illustrates an alignment method and apparatus in accordance with an embodiment of the invention. The section A-A of FIG. 2a (showing a substrate and chip, with electrode pattern) and the cross-section B-B of FIG. 2b are both shown in FIG. 2c. Also, FIGS. 2a and 2b include respective close-up views using camera vision of portions of the structures of those Figures.
Figure 2A:
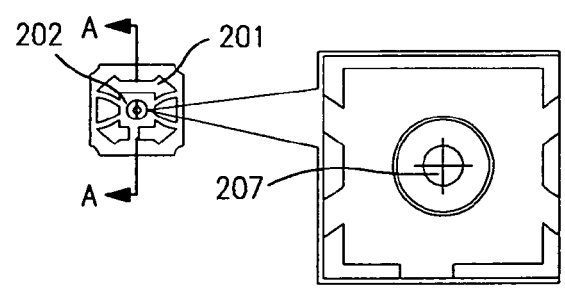
Figure 2B:
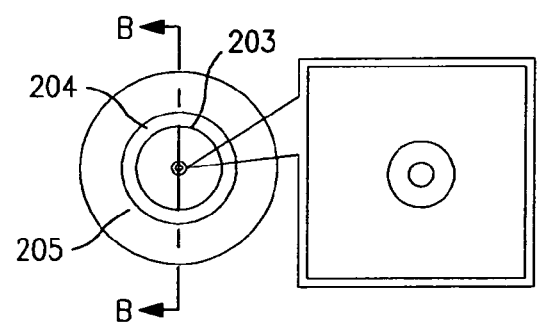

Referring initially to FIG. 2, a substrate 201 is shown as having a TCLED (tilted charge light-emitting device) on a chip 202 which is mounted on the substrate 201. The plan view of FIG. 2a shows the substrate 201 and the TCLED chip 202 as having a lens 220 over the TCLED, the lens being more prominently seen in the camera vision enlarged close-up view to the right of the plan view. An alignment marking is shown as being provided on the lens. In this example, the alignment marking comprises orthogonal diameter lines forming a cross-hair on the lens, and/or an annular ring defining the lens diameter, as seen in the Figure. As shown in FIGS. 2b and 2c, an annular receptacle 204 is provided, and a tubular alignment pin with a central passageway 205A has its proximal end 205B which, in this embodiment is of reduced diameter, slidably fitted in the annulus of the receptacle. An annular spacer 203 can be disposed on the proximal tip of the alignment pin and receptacle. The top view of FIG. 2b further illustrates the spacer 203, the outer annular portion of the receptacle 204, and the ledge below of alignment pin 205. The proximal end of the through-hole 205A of the alignment pin is more prominently seen in the camera vision enlarged close-up view to the right of the top view in FIG. 2b, which also shows the cross-hair alignment marking seen therethrough.

Figure 3:
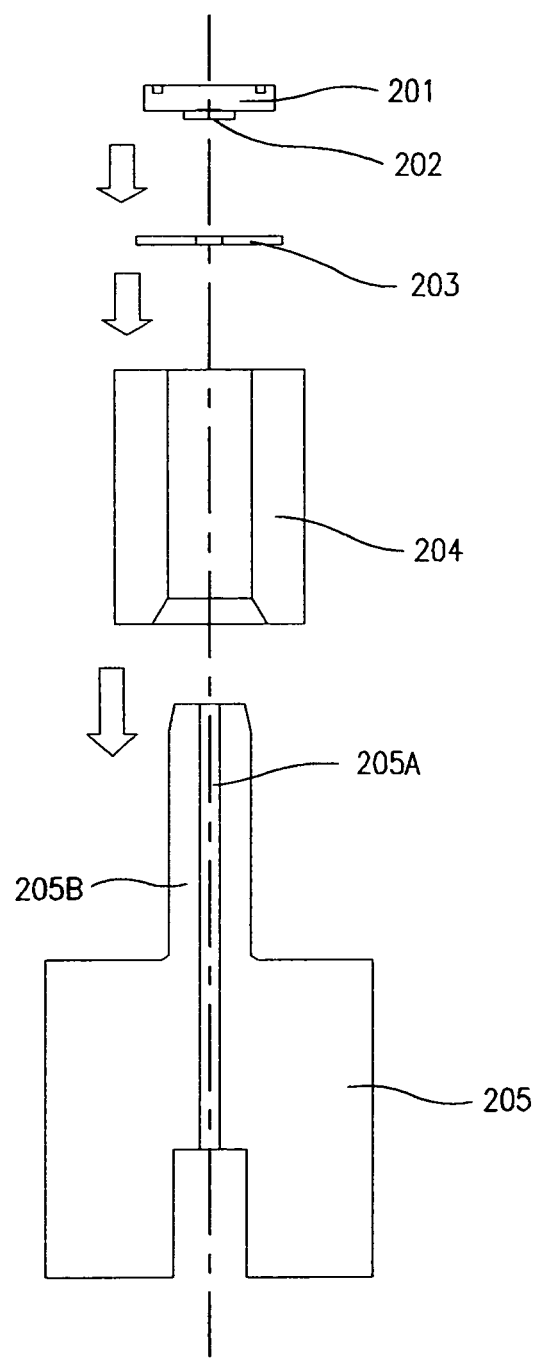
FIG. 3 is an exploded cross-sectional view of equipment that is useful in understanding the assembly process in accordance with an embodiment hereof.

Processing steps of an embodiment of the invention include the following (see FIG. 3): The receptacle 204 is inserted onto the alignment pin 205. The surface of the pin should be perpendicular to the horizontal axis to achieve top surface levelness. The through-hole in the alignment pin is used for application of vacuum to hold and couple the TCLED chip 202, mounted on substrate 201, to the pin surface (with optional intervening spacer 203, as will be described further). The through-hole 205A is precisely at the center of the pin 205 so that it can be used as a mask for alignment during the attachment procedure to ensure the concentricity of the chip placement.

The pin 205 preferably protrudes from the receptacle by at least a few microns to facilitate coupling of the chip. The center through-hole of the pin 205 and the alignment marking on the lens of the TCLED chip are used as the masks for alignment during the placement. The vacuum is turned on to hold and couple the TCLED chip 202 surface to the surface of pin 205. The substrate 201 is then secured in its position on the receptacle, for example by using an adhesive such as an epoxy.

By placing the TCLED chip on the alignment pin with flat top surface and with center vacuum hole as planarity guidance, co-planarity is realized by pressing the TCLED chip planar to the pin's top surface and by vacuum to hold the chip in order to couple it with the surface of the alignment pin.

After the assembly, the alignment pin is replaced by an optical fiber, which is accurately positioned in a ferrule center. Co-planarity is now accordingly maintained between the TCLED chip and the optical fiber surface.

The present invention thus enables the optical axis of the light-emitter chip to be aligned to the optical fiber core by only using XY axes.

In accordance with a feature of the invention, and as described further hereinbelow, a gap between the TCLED chip 202 and the pin 205 surface can be created by using an annular spacer 203 with good thickness uniformity and with a center opening to allow light transmission. Co-planarity between the spacer 203 bottom surface and the pin 205 surface is achieved by coupling the two surfaces. Spacer 203 is secured at its position using epoxy. TCLED chip 202 is then placed on the spacer 203 surface with the vacuum holding from the pin 205 center hole to couple the surface of the TCLED chip 202 to the top surface of the spacer 203 and achieve the co-planarity between both surfaces. As above indicated, the center vacuum hole of the pin 205 and the alignment marking on the TCLED chip 202 are used as the masks for alignment during chip placement.

Figure 1:
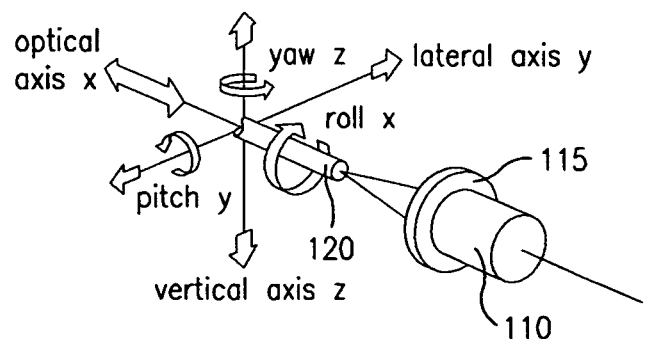
FIG. 1 is a diagram illustrating an active alignment process of the prior art. The diagram illustrates a focused laser source alignment into an optical fiber.
Figure 4:
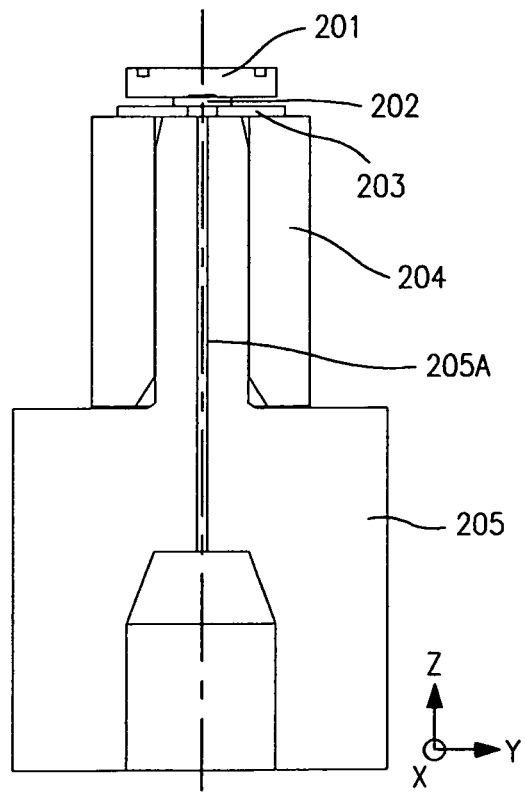
FIG. 4 shows the elements of FIG. 3 with vacuum suction applied, and the aligned chip placement.
Figure 5:
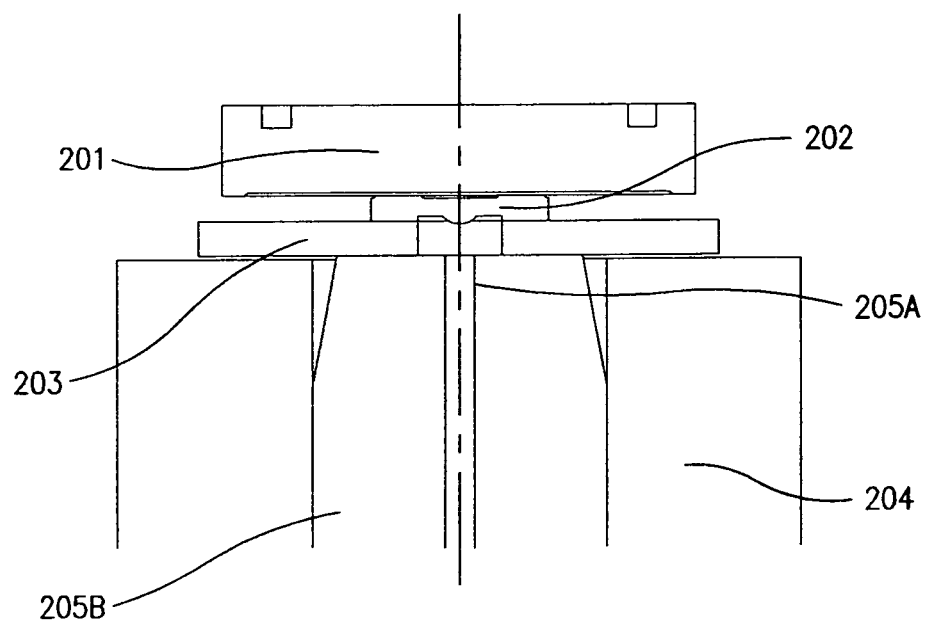
FIG. 5 is an enlarged partially broken away view of a portion of the cross-section of FIG. 4, showing the substrate, the chip with light-emitter, the spacer, and the proximal ends of the pin and receptacle.

FIG. 4 shows the assembly with vacuum suction applied through the through-hole 205A. As above indicated, the substrate 201 can then be secured to its position on the receptacle 204 using an adhesive. FIG. 5 shows an enlargement of the pin portion 205B, receptacle 204, spacer 203, TCLED chip 202, and substrate 201.

Figure 6:
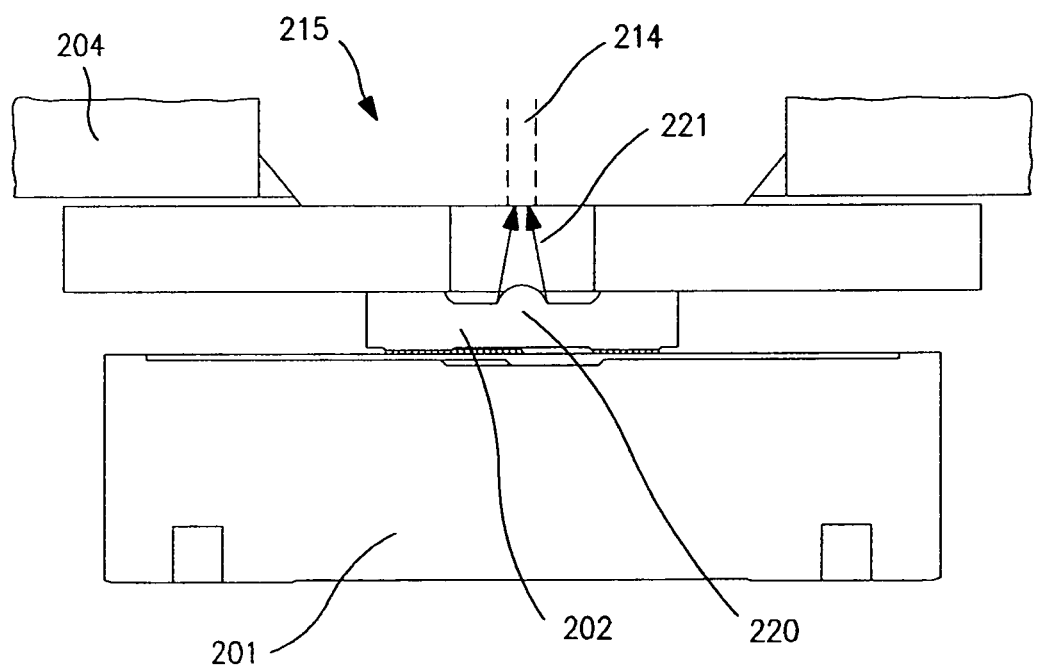
FIG. 6 shows, inverted, the cross-section of the elements of FIG. 5, but with the fiber mounted ferrule in place of the pin, and illustrating how the spacer is operative to maximize input of focused light into the fiber.

FIG. 6 illustrates how the spacer 203 is employed to facilitate the focusing of emitted light into the aligned optical fiber. As seen in the Figure, the pin 205 has been removed and replaced by the optical fiber 214 in ferrule 215, which is fitted in receptacle 204. The substrate is again represented at 201, and the light-emitting device chip is represented at 202. Light emitted by the TCLED is focused by the lens 220, as shown in the Figure at 221, and the distance between the lens and the input end of the optical fiber, determined by the thickness of spacer 203, allows for efficient coupling of the focused light into the input end of the fiber. The advantage of matching of the spacer thickness to the approximate focal length of the lens 220 combines with the precision alignment hereof to maximize light coupling and minimize attenuation.

Figure 7C:
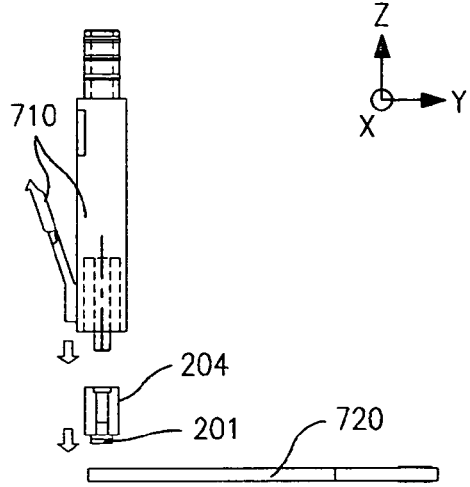
Figure 7C:
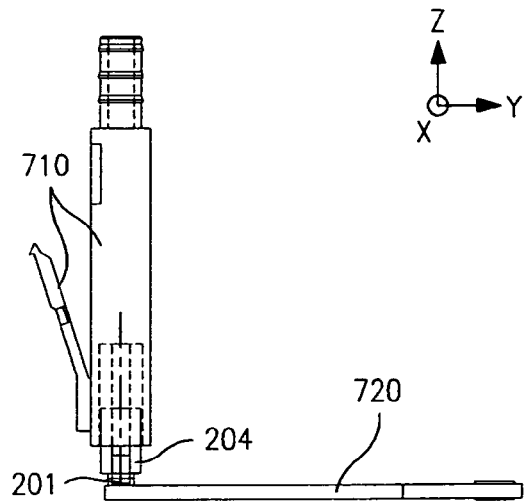
Figure 7C:
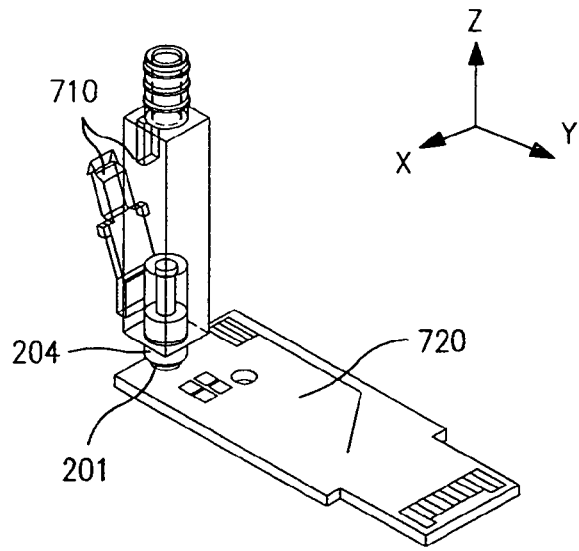

In a typical optical transmitter assembly, a chip containing a semiconductor light emitter is coupled with a fiber optical cable in a connector 710 (see FIG. 7), the chip being secured to a printed circuit board 720. In the illustration of FIG. 7, the exploded view of FIG. 7a shows the circuit board 720, the light-emitter containing chip in substrate 201 in receptacle 204 (aligned as previously described), ready to receive the optical fiber 214 encased in ferrule 215 which is, in turn, within connector 710. The FIG. 7b shows a side view of the completed assembly, and the FIG. 7c is an isometric view thereof.

The invention has been described with reference to particular preferred embodiments, but variations within the spirit and scope of the invention will occur to those skilled in the art. For example, it will be evident that the receptacle 205 can be suitably designed for its interface function.

The invention claimed is:

1. A method for aligning a ferrule-mounted optical fiber with the optical axis of a semiconductor light-emitting device having an associated lens, comprising the steps of:
   providing an alignment marking with respect to said device in relation to said optical axis by providing an alignment marking on said lens;
   providing an annular receptacle and a tubular alignment pin with a central passageway, having its proximal end slidably fitted in the annulus of said receptacle;
   aligning the proximal end of said alignment pin with said alignment marking;
   securing said device to said receptacle;
   removing said alignment pin from said receptacle; and
   inserting said ferrule-mounted optical fiber into said receptacle.

2. The method as defined by claim 1, wherein said semiconductor light-emitting device comprises a semiconductor tilted-charge light-emitting device.

3. The method as defined by claim 1, wherein said step of aligning the proximal end of said alignment pin with said alignment marking comprises aligning the proximal opening of said central passageway with said alignment marking.

4. The method as defined by claim 3, wherein said aligning of the proximal opening of said central passageway with said alignment marking comprises sighting said alignment marking through said central passageway.

5. The method as defined by claim 1, wherein said step of aligning the proximal end of said alignment pin with said alignment marking further comprises applying a vacuum to said central passageway at the distal end of said alignment pin.

6. The method as defined by claim 1, wherein said light-emitting semiconductor device is mounted on a substrate, and wherein said step of securing said device to said receptacle includes securing said substrate to said receptacle.

7. The method as defined by claim 1, further comprising providing a spacer between said receptacle and said device before said aligning step.

8. The method as defined by claim 7, wherein said step of providing said spacer comprises providing an annular spacer positioned to remain in said receptacle when said device is secured to said receptacle.

9. The method as defined by claim 1, wherein said step of providing an alignment pin comprises providing said pin as having its proximal end coplanar with a surface of said device.

10. The method as defined by claim 8, wherein said step of providing an alignment pin comprises providing said pin as having its proximal end coplanar with a surface of said spacer.

11. An aligning apparatus for use in a method for aligning a cylindrical ferrule-mounted optical fiber with the optical axis of a light-emitting electro-optical device having an alignment marking in relation to its optical axis, comprising:
   an annular receptacle having an inner diameter that conforms with the diameter of said ferrule;
   a tubular alignment pin with a central passageway, having its proximal end slidably fitted in the annulus of said receptacle; and
   a vacuum source coupleable to the central passageway at the distal end of said alignment pin;
   whereby, after aligning the proximal end of said alignment pin with said alignment marking and securing said device to said receptacle, said alignment pin can be removed from said receptacle, and said ferrule-mounted optical fiber can be inserted into said receptacle.

12. Apparatus as defined by claim 11, wherein said device comprises a light-emitting semiconductor device mounted on a substrate, and wherein said substrate is secured to said receptacle after alignment.

13. Apparatus as defined by claim 11, further comprising an annular spacer disposed between said receptacle and said device prior to alignment.

14. An aligning apparatus for use in a method for aligning a cylindrical ferrule-mounted optical fiber with the optical axis of a light-emitting electro-optical device having an alignment marking in relation to its optical axis, comprising:
- an annular receptacle having an inner diameter that conforms with the diameter of said ferrule;
- a tubular alignment pin with a central passageway, having its proximal end slidably fitted in the annulus of said receptacle; and
- an annular spacer;
- whereby, after aligning the proximal end of said alignment pin with said alignment marking and securing said device to said receptacle with said spacer therebetween, said alignment pin can be removed from said receptacle, and said ferrule-mounted optical fiber can be inserted into said receptacle.

15. Apparatus as defined by claim 14, wherein said device comprises a light-emitting semiconductor device mounted on a substrate, and wherein said substrate is secured to said receptacle after alignment.

\* \* \* \* \*